United States Patent [19]

Penzhorn et al.

[11] Patent Number: 4,849,155

[45] Date of Patent: Jul. 18, 1989

[54] PROCESS AND APPARATUS FOR DECONTAMINATING EXHAUST GAS FROM A FUSION REACTOR FUEL CYCLE OF EXHAUST GAS COMPONENTS CONTAINING CHEMICALLY BONDED TRITIUM AND/OR DEUTERIUM

[75] Inventors: Ralf-Dieter Penzhorn, Bruchsal; Manfred Glugla; Peter Schuster, both of Karlsruhe, all of Fed. Rep. of Germany

[73] Assignee: Kernstorschungzentrum Karlsruhe GmbH, Karlsruhe, Fed. Rep. of Germany

[21] Appl. No.: 19,735

[22] Filed: Feb. 27, 1987

[30] Foreign Application Priority Data

Feb. 27, 1986 [DE] Fed. Rep. of Germany ....... 3606316

[51] Int. Cl.⁴ .................... G21C 19/42; G21C 19/02; C01B 1/26; G21F 9/02
[52] U.S. Cl. ........................ 376/146; 55/16; 55/66; 252/627; 252/630; 376/314; 423/248; 423/647.7; 423/651; 423/652; 423/653; 423/654; 423/657; 423/580
[58] Field of Search .............. 252/630, 626, 627, 373; 376/310, 311, 314, 146; 208/58, 110, 112, 121, 124, 125; 55/16, 66; 423/248, 648 R, 648 A, 651, 652, 653, 654, 656, 657; 518/703

[56] References Cited

U.S. PATENT DOCUMENTS

| | | | |
|---|---|---|---|
| 2,533,138 | 12/1950 | Newton | 23/210 |
| 3,061,403 | 10/1962 | Rendos | 23/2 |
| 3,198,604 | 8/1965 | Pfefferle | 23/212 |
| 3,870,622 | 3/1975 | Ashton et al. | 208/93 |
| 3,926,782 | 12/1975 | Plank | 208/135 |
| 4,058,449 | 11/1977 | Reitz et al. | 208/59 |
| 4,173,620 | 11/1979 | Shimizu | 423/249 |
| 4,178,350 | 12/1979 | Collins | 423/248 |
| 4,276,060 | 6/1981 | Aldridge | 55/67 |
| 4,282,084 | 8/1981 | Gross et al. | 208/113 |
| 4,313,911 | 2/1982 | Moran et al. | 422/159 |
| 4,350,614 | 9/1982 | Schwartz | 208/120 |
| 4,487,670 | 12/1984 | Bellanger et al. | 204/129 |
| 4,522,894 | 6/1985 | Hwang et al. | 429/17 |
| 4,673,547 | 6/1987 | Iniotakis et al. | 376/314 |
| 4,707,342 | 11/1987 | Iniotakis et al. | 423/248 |

FOREIGN PATENT DOCUMENTS 1238884 4/1967 Fed. Rep. of Germany .
1470361 of 1967 France .

OTHER PUBLICATIONS

Kerr et al., *Proc. Tritium Technology in Fission, Fusion & Isotopic Application*, "Fuel Cleanup System for the Tritium Systems Test Assembly: Design & Experiments", Dayton, Ohio, Apr. 29, 1980, pp. 115 to 118.

*Primary Examiner*—Howard J. Locker
*Attorney, Agent, or Firm*—Sughrue, Mion, Zinn, Macpeak and Seas

[57] ABSTRACT

Process for decontaminating exhaust gas from a fusion reactor fuel cycle of exhaust gas components containing at least one heavy hydrogen isotope selected from tritium and deuterium in compound form, in which the at least one heavy hydrogen isotope is liberated from its compound, separated out from the exhaust gas and fed back into the fuel cycle, the compound form being at least one compound which is ammonia or a hydrocarbon, comprising:
  (a) converting the at least one heavy hydrogen-containing compound into its elements in the exhaust gas by cracking the at least one heavy hydrogen containing compound with a cracking medium to liberate the hydrogen isotope,
  (b) passing the liberated hydrogen isotope through a membrane to separate out the liberated hydrogen isotope from the flow of the remaining exhaust gas, and
  (c) discharging the remaining decontaminated exhaust gas into the surrounding air.

15 Claims, 5 Drawing Sheets

PROCESS AND APPARATUS FOR DECONTAMINATING EXHAUST GAS FROM A FUSION REACTOR FUEL CYCLE OF EXHAUST GAS COMPONENTS CONTAINING CHEMICALLY BONDED TRITIUM AND/OR DEUTERIUM

BACKGROUND OF THE INVENTION

The present invention relates to a process and an apparatus for decontaminating exhaust gas from a fusion reactor fuel cycle of exhaust gas components containing chemically bonded tritium and/or deuterium, in which tritium and/or deuterium is/are liberated from its/their compounds, separated out from the exhaust gas and fed back into the fuel cycle.

The exhaust gas from a fusion reactor fuel cycle contains about 85%-by-volume noble gases and about 15%-by-volume impurities, including small residual amounts of heavy hydrogen. The impurities accumulate in the form of argon, "tritiated" and/or "deuterated" hydrocarbons, particularly tritiated and/or deuterated" $CH_4$, tritiated and/or deuterated water and tritiated and/or deuterated ammonia. The exhaust gas must thus be liberated both from free tritium as well as impurities containing tritium and be decontaminated to a value level permissible for emission before the exhaust gas remainder can be released into the surrounding atmosphere. Moreover, it is desirable to recover the tritium and deuterium from their compounds and to feed the tritium and deuterium back into the fuel cycle, not least because it is in this way guaranteed that the tritium is kept from entering the surrounding atmosphere.

A process and an apparatus for decontaminating exhaust gas of tritium and/or deuterium has been suggested by Kerr et al, "Fuel Cleanup System for the Tritium Systems Test Assembly: Design and Experiments", *Proceedings of Tritium Technology in Fission, Fusion and Isotopic Application,* Dayton, Ohio, Apr. 29, 1980, at pages 115 to 118. According to one process described by Kerr et al, the exhaust gas containing the impurities is first passed through an intermediate container, that is, a variable volume surge tank which is used to remove flow fluctuations and provide a constant feed pressure. The exhaust gas is then passed to a first catalytic reactor in which any free oxygen is reduced and combined with hydrogen at 450° K. to form water. The exhaust gas is then sent to a molecular sieve bed at 75° K. in which all impurities are adsorptively removed and are thus separated out from the exhaust gas. When the capacity of the molecular sieve bed is exhausted, it is heated to 400° K. to desorb the impurities which are then sent to a second catalytic reactor in the form of an oxygen-supplying packed bed operating at 800° K. where the impurities (e.g., ammonia and hydrocarbons) are oxidized into tritium- and/or deuterium-containing water and into tritium- and/or deuterium-free compounds, namely into $CO_2$, $N_2$ and Ar. The tritium- and/or deuterium-containing water then is frozen out at 160° K., and thereafter the frozen water is periodically vaporized. The vapors are fed into a hot uranium metal bed which acts as a getter and which at 750° K. transforms (reduces) the water into D- and/or T-containing hydrogen and stable $UO_2$. In lieu of the reduction by means of the uranium metal bed, Kerr et al state that the reduction can also be carried out with the aid of an electrolytic cell when such a cell becomes available.

Kerr et al also describe a process based on hot uranium metal getters. In this process, the exhaust gas, after leaving the variable volume surge tank, enters a primary uranium bed operating at 1170° K. In this bed, impurities are removed by chemical reactions that form uranium oxides, carbides, and nitrides. The inert argon, with traces of the other impurities, passes through the primary uranium bed and is sent to a molecular sieve bed as in the above-described process. The regenerated argon, with a small amount of tritium, is sent from the molecular sieve bed to a titanium bed, at 500° K., which collects DT and passes on an argon stream containing only tenths of a ppm of DT. Kerr et al state that a disadvantage of this process is that operating temperatures of 1170° K. cause permeation and material problems.

Kerr et al also describe the use of palladium diffusers, and state that they have numerous disadvantages including the need for elevated pressures, reported brittle failures during temperature cycling, reported poisoning by ammonia and methane, and the fact that they can not produce an impurity stream free of hydrogen isotopes.

The processes suggested heretofore for decontaminating exhaust gases of tritium and/or deuterium have the following disadvantages: many steps in the process; high temperature and thus the danger of tritium losses through permeation; operation of the oxygen-supplying packed bed (second catalytic reactor) at high temperatures, with which is associated a possible sintering of the packed bed particles as well as an excess of oxygen given off (deactivation), which strains the hot metal getter; transformation of ammonia and hydrocarbons by oxidation at the second catalytic reactor with formation of water and subsequent reduction of the water created by the hot metal getter (strain on the hot metal getter); oxidation of hydrogen to water at the first catalytic reactor and subsequent reduction of the water created by the hot metal getter (strain of the hot metal getter); high radioactive waste solids and creation of nitrogen oxides during $NH_3$ oxidation of the oxygen-supplying packed solids bed (second catalytic reactor).

SUMMARY OF THE INVENTION

An object of the present invention is to provide a process and an apparatus for decontaminating the exhaust gas from a fusion reactor fuel cycle of exhaust gas components which contain tritium and/or deuterium in chemically bonded form.

A further object of the present invention is to provide such a process in which tritium and/or deuterium losses through permeation and the high stresses of the hot metal getter materials, as they appeared in the heretofore known prior art processes, as well as the formation of nitrogen oxides are avoided.

Another object of the present invention is to provide such a process which is energy-saving vis-a-vis the heretofore known prior art processes and which is able to be implemented simply.

A still further object of the present invention is to provide such a process which is able to feed back the liberated tritium and/or deuterium into the fuel cycle without further treatment steps, with the exception of an isotope separation.

Additional objects and advantages of the present invention will be set forth in part in the description which follows and in part will be obvious from the description or can be learned by practice of the invention. The objects and advantages are achieved by means of the processes, instrumentalities and combinations particularly pointed out in the appended claims.

To achieve the foregoing objects and in accordance with its purpose, the present invention provides a process for decontaminating exhaust gas from a fusion reactor fuel cycle of exhaust gas components containing at least one heavy hydrogen isotope selected from tritium and deuterium in compound form, in which the at least one heavy hydrogen isotope is liberated from its compound, separated out from the exhaust gas and fed back into the fuel cycle, the compound form being at least one compound which is ammonia or hydrocarbon, comprising: (a) converting the at least one heavy hydrogen containing compound into its elements in the exhaust gas by cracking the at least one heavy hydrogen containing compound with a cracking medium to liberate the hydrogen isotope, (b) passing the liberated hydrogen isotope through a membrane to separate out the liberated hydrogen isotope from the flow of the remaining exhaust gas, and (c) discharging the remaining decontaminated exhaust gas into the surrounding air.

The medium for cracking ammonia preferably is a membrane made of palladium or made of a palladium-silver alloy or an Ni catalyst. The medium for cracking the hydrocarbon preferably is an Ni catalyst. When ammonia and hydrocarbons both are to be cracked, the cracking reactions can take place in successive steps or can occur in a common process step. The separation of the liberated hydrogen isotopes from the exhaust gas can occur in a common process step or can take place in successive steps, when a closed loop operation with gas circulation is selected and the hydrogen isotopes from the cracking of ammonia are separated through the membrane for cracking and the hydrogen isotopes from the cracking of hydrocarbon are separated through the same membrane. In case of a once-through operation an additional membrane would be required.

In a preferred embodiment of the process according to the present invention, the cracking reactions for ammonia and the hydrocarbons are carried out at an Ni-catalyst on a ceramic catalyst support at a temperature ranging between 250° C. and 450° C., the membrane is made of palladium or a palladium-silver alloy and surrounds the catalyst, and the catalyst which is inside the membrane is heated simultaneously with the membrane to the reaction temperature.

Preferably, the exhaust gas is first selectively oxidized at an oxidation catalyst to oxidize CO and $CO_2$, then brought into contact with an $O_2$ getter metal at a temperature ranging from 200° C. to 400° C. in order to eliminate $O_2$ and to reduce water. Preferably, in order to crack the ammonia and hydrocarbons, the exhaust gas then is brought into contact with a hydrogen-isotope-permeable membrane and with an Ni-catalyst at a temperature ranging from 300° C. to 450° C.

The apparatus according to the present invention for the purpose of implementing the process comprises an exhaust gas conduit which is channeled into the cycle, and arranged in succession in the conduit in the flow direction of the exhaust gas there is: (a) a buffer vessel for equalizing the gas pressure, (b) a catalyst bed for selectively oxidizing CO into $CO_2$, (c) a heatable metal bed for selectively removing $O_2$ and water from the exhaust gas by means of chemical reaction, (d) a container holding at least one membrane which is selectively permeable to hydrogen isotopes, the container having a product discharge valve for the hydrogen isotopes, and (e) a heatable bed containing a regeneratable Ni-catalyst and having an inflow and an outflow for a regeneration agent. Preferably, at least one pump is provided to circulate the exhaust gas.

In an alternate embodiment of the apparatus, in lieu of the combination of the container holding the membrane and the heatable bed containing the regeneratable Ni-catalyst, there is an externally-coolable container which is cooled on the outside to a temperature $\leq 200°$ C., the container having: (i) a vessel mounted in the container and made of palladium/or a palladium-silver alloy, the vessel containing an Ni-catalyst, the vessel having a supply feed conduit for feeding the exhaust gas which is to be decontaminated into the vessel and a discharge conduit for removing the decontaminated exhaust gas from the vessel, (ii) a gas outlet for the hydrogen isotopes separated out from the exhaust gas, and (iii) a heater for the vessel positioned between the vessel and the inner wall of the container. It is especially advantageous when the vessel is designed as a spiral-shaped pipe.

It is to be understood that both the foregoing general description and the following detailed description are exemplary and explanatory, but are not restrictive of the invention.

DETAILED DESCRIPTION OF THE INVENTION

Figure 1:
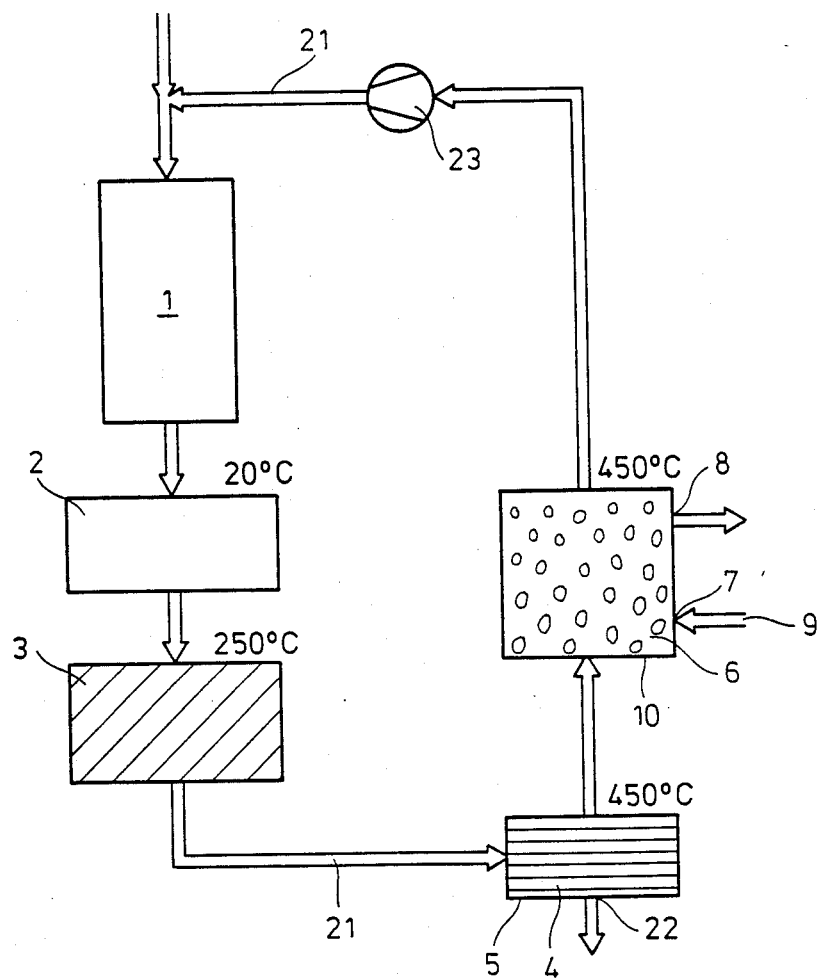
FIG. 1 shows a schematic representation of one embodiment of an apparatus according to the present invention, in which the cracking of ammonia and the cracking of the hydrocarbons takes place in two separate and different parts of the apparatus.

The exhaust gas from the fuel cycle of a fusion reactor has more or less the following composition:
80 to 85 Mol. % He, Ar
15 to 20 Mol. % $N(Q)_3$, $C(Q)_4$ $(Q)_2O$, $(Q)_2$, CO, $CO_2$, $N_2$ and $O_2$. (Q=H, D, T)

It is quite obvious that a portion of the heavy hydrogen isotopes can be supplanted by light hydrogen (protium) in the appropriate bondings.

The advantages of the process according to the present invention and the apparatus according to the present invention are to be seen in the fact that (a) a reduction in the number of treatment steps is achieved, (b) with the exception of the cracking temperature for $NQ_3$ and $CQ_4$, the maximal operating temperature within the cycle system does not exceed 400° C. and therefore no losses of tritium can take place by permeation through metallic walls, (c) a minimization of radioactive waste solids is attained, (d) a reduction of the strain of the oxygen getter (of the metal bed) to a minimum takes place (in the present invention there is no in-situ $O_2$ formation as a result of chemical cracking of ammonia and hydrocarbon at an oxygen-supplying packed bed) (the catalyst bed in the present invention is employed for selective oxidation of CO into $CO_2$); (in the present invention there is no $Q_2$ oxidation to water and therefore there is no subsequent reduction of the water on the oxygen getter), (e) no nitrogen oxide formation takes place and (f) in the event of a combination of cracking of tritiumized and/or deuteriumized impurities ammonia and hydrocarbons with the separation of tritium and/or deuterium: shifting the thermodynamics and kinetics of the chemical reaction in a direction more favorable to the process.

In the prior art process which was discussed above, permeation losses of heavy hydrogen can occur both in the catalytic oxidation of the oxidizable exhaust gas components as well as in the reduction of water to hydrogen in the uranium bed.

In the process according to the present invention, the exhaust gas is introduced as feed gas into a pipeline channeled into the cycle, flows through a buffer vessel and then, at about room temperature (20° to 25° C.), passes through a packed bed functioning as a catalyst. The packed bed contains, for example, hopcalite ($CuO/MnO_2$) or perovskite. From this, oxygen and carbon monoxide contained in the exhaust gas are selectively converted to $CO_2$.

The exhaust gas leaving this catalyst is subsequently passed over a bed, which can, for example, contain uranium metal or titanium metal, at a temperature between about 200° and about 400° C., preferably at 350° C., in which water is cracked thereby forming hydrogen and, for example, uranium oxide; and oxygen, including any oxygen which possibly was not transformed into carbon dioxide, is gettered.

The exhaust gas leaving this oxygen getter is then conducted through a container which contains one or more membranes made of palladium or of a palladium-silver alloy at a temperature between about 300° and about 450° C., preferably at 400° to 450° C., and at the membranes the ammonia contained in the exhaust gas is quantitatively cracked. The membranes can be designed as a directly-heated pipe or pipe assembly, which is jacketed around with a cooled external vessel or container. The membranes are selectively permeable to hydrogen isotopes, and thus from this membrane container, the heavy hydrogen which emerged from the cracking process is drawn off, and (if necessary, after passing a hydrogen isotope separating apparatus) is fed back into the fuel cycle of the fusion reactor.

The exhaust gas liberated from ammonia in this way is then passed through a nickel catalyst packed bed which is heated to a temperature of about 250° to about 450°, preferably to 450° C., for the purpose of cracking the hydrocarbons, methane in particular. The cracking takes place according to the following formula,

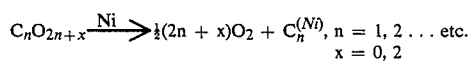
$$C_nO_{2n+x} \xrightarrow{Ni} \tfrac{1}{2}(2n + x)O_2 + C_n^{(Ni)}, n = 1, 2 \ldots \text{etc.} \quad x = 0, 2 \quad (1)$$

According to its degree of purity, the remaining gas which leaves the nickel catalyst packed bed can either be discharged directly into the surrounding air or be run through the cycle until it reaches the required purity, whereby it first flows through the buffer vessel again and then the catalyst beds, oxygen getter and containers, as described.

In time, the catalyst is depleted and must be either thrown out or regenerated with hydrogen at a sufficiently high temperature, according to the following formula:

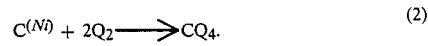
$$C^{(Ni)} + 2Q_2 \longrightarrow CQ_4. \quad (2)$$

While the known process according to the prior art contains at least 7 process steps whose individual operational temperatures are far removed from one another (the greatest temperature difference between any two successive and consecutive steps amounts to 640° C. in the embodiment of the Kerr et al process which employs a catalytic reactor to oxidize all oxidizable components of the exhaust gas), the process according to the present invention is designed so that the three or four steps show significantly smaller temperature differentials on a path in which the temperature rises exclusively. Whereas in the process belonging to the state of the art the catalytic oxidation of all oxidizable components of the exhaust gas takes place at 800° K. (527° C.), in the process according to the present invention the catalytic oxidation is only selectively applied to oxidize CO into $CO_2$ at low temperatures in the range of 20° to 25° C. In the process according to the present invention, the subsequent reduction of water and the removal of oxygen by means of a getter metal at moderate temperatures, for example, at 250° C., then makes possible the cracking step(s) for ammonia and hydrocarbons. It is immaterial here for the quantitative cracking of ammonia whether or not it is cracked on the palladium membrane or the membrane made of palladium-silver alloy or at the Ni-catalyst.

Referring now to the drawings, there is shown in FIG. 1, a conduit 21 which is channeled into the fuel exhaust gas cycle. Arranged in the conduit in the flow direction of the exhaust gas, there is a buffer vessel 1 which is used to remove flow fluctuations and provide a constant feed pressure. On leaving buffer vessel 1, the exhaust gas enters a packed catalyst bed 2 containing a catalyst, for example, hopcalite, where CO contained in the exhaust gas is selectively oxidized to $CO_2$ at about 20° to about 25° C. The exhaust gas then enters a heatable metal bed 3, which contains an $O_2$ getter metal, for example, uranium metal or titanium metal, which is heated to a temperature of about 200° to about 400° C. and which reduces water and selectively removes oxygen from from the exhaust gas by chemical reaction. The exhaust gas leaving metal bed 3 then is conducted to a container 5 which contains one or more membranes 4 made of palladium or a palladium-silver alloy for cracking ammonia into $N_2$ and hydrogen isotopes. Membranes 4 are hydrogen-isotope permeable. Container 5 is provided with a product discharge valve 22 for the hydrogen isotopes which are formed and which penetrate through the walls of membrane 4. The remaining exhaust gas, now liberated from ammonia, is passed to a heatable metal bed 10 which contains nickel catalyst 6 and which is heated to a temperature of about 250° to about 450° C., for the purpose of cracking the hydrocarbons, particularly methane. The cracked gas which leaves bed 10 can be discharged directly into the surrounding air or can be run through the cycle again until it reaches the required purity. One or more pumps 23 are provided in conduit 21 to pump the exhaust gas through the conduit.

Heatable bed 10 is provided with an inflow line 7 for conducting a regenerating agent 9, e.g., $Q_2$, into the bed to regenerate nickel catalyst 6, and an outflow line 8 for conducting out of the bed any gaseous products which have formed during the regeneration.

Figure 2:
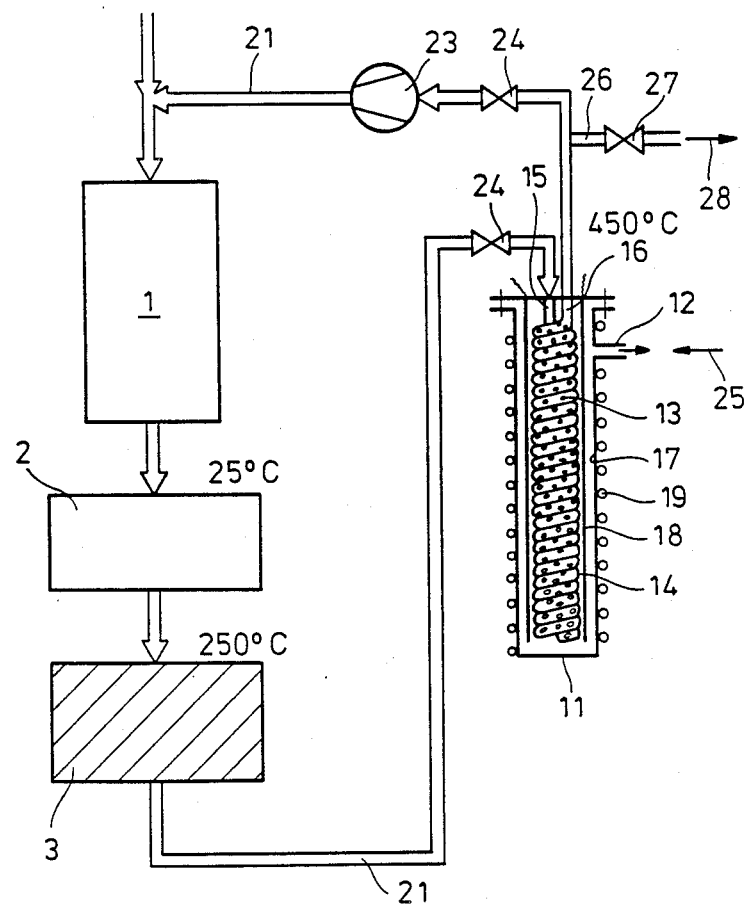
FIG. 2 shows a schematic representation of another embodiment of an apparatus according to the present invention, in which ammonia and hydrocarbons are simultaneously cracked in the same part of the apparatus.

The examples of the apparatus shown in FIGS. 1 and 2 are essentially differentiated only by the fact that the combination of (a) the externally-cooled container 5, which holds the membranes 4 which are heated to 450° C., and (b) the bed 10, which is externally-cooled and heated inside to 450° C., in FIG. 1 is replaced by one single part, namely, by the externally-cooled container 11 which, in the example in FIG. 2, is provided with a vessel in the form of a membrane pipe 14, heated to about 400° C., which is mounted in container 11. Membrane pipe 14 preferably is made of palladium or a palladium-silver alloy, preferably is the form of a spirally-turned pipe (shown in FIG. 2 as a section drawing), and contains a nickel catalyst 13 mounted on a ceramic support.

Membrane 14 is provided with an input conduit 15 for the exhaust gas which is to be decontaminated and a discharge conduit 16 for removing the decontaminated exhaust gas. The hydrogen isotopes formed within membrane pipe 14 penetrate through the walls of the membrane and leave through a gas discharge outlet 12 provided in container 11. A heater 18 for heating membrane pipe 14 is positioned in container 11 between membrane pipe 14 and the inner walls 17 of container 11. A cooling jacket 19 surrounds the outside walls of container 11.

The regeneration of the Ni-catalyst 13 charged with carbon takes place through the input of the regeneration agent, for example, through the input of hydrogen 25, by way of gas discharge outlet 12 and membrane pipe 14. First, valves 24 in conduit 21 are closed and valve 27 opened. Then, the hydrogen is passed through gas discharge outlet 12 and penetrates the walls of membrane pipe 14 so that it reaches the nickel catalyst which is inside the membrane pipe. At about the same operational temperature, about 450° C., the carbon reacts with the $Q_2$ according to equation (2). The resulting methane-$Q_2$ mixture 28 is drawn off from membrane pipe 14 through a regeneration agent outlet 26 of conduit 21.

Figure 3:
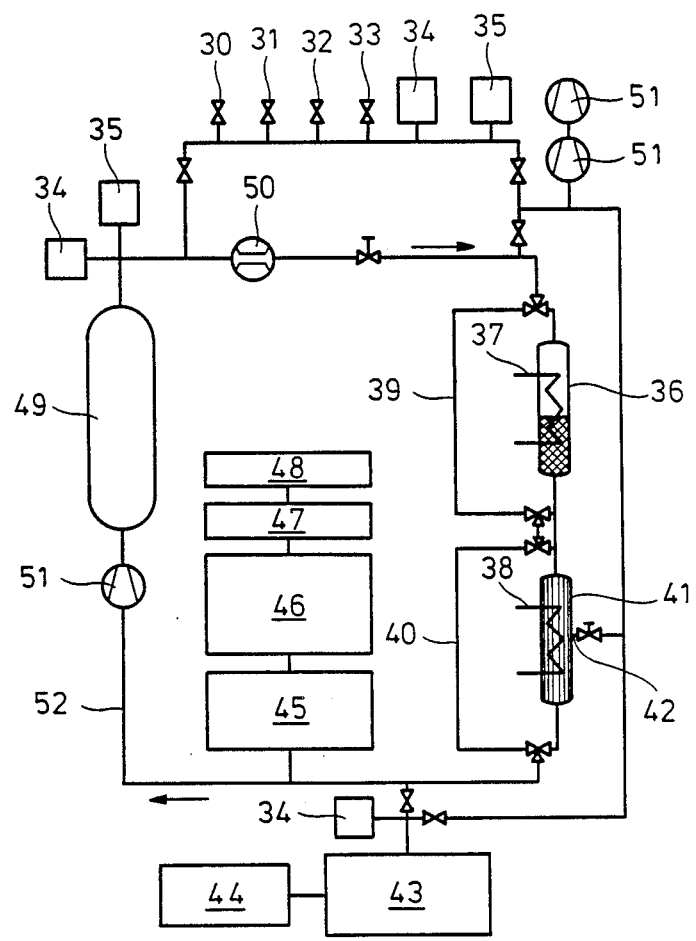
FIG. 3 shows a schematic representation of a testing set-up for an experimental process, with which the effectiveness of the process according to the present invention has been ascertained.

The process according to the present invention was examined for its effectiveness in a testing set-up mode which is represented in FIG. 3. As a replacement here for a real exhaust gas from a fusion reactor fuel cycle, a process gas which was to be treated was simulated by using a gas mixture made up of helium, with up to 15 Mol% ammonia and/or methane, with or without the addition of small amounts of other relevant gases.

In the testing procedure, these gas mixtures were fabricated by inputting the gas helium through input valve 31, ammonia through input valve 32, methane through input valve 33 and other gases through input valve 30. The gas mixtures were conducted through a nickel catalyst bed 36 at a high rate of flow, that is, at a high flow speed, namely at 150 l/h. The nickel catalyst in a quartz pipe, is heated to the desired temperature from the outside with a foldable pipe furnace (not shown in the drawing, indicated rather by heater 37). The pipe furnace is attached onto a fully electronic regulator (not shown in the drawing).

The gas mixture was thereafter conducted through a Pd/Ag membrane 41 which was operated with the aid of a heater 38 at a temperature of $\leq 450°$ C., and the hydrogen formed from the catalytic cracking of methane and ammonia continually separated out through outlet 42. The catalyst vessel 36 as well as the Pd/Ag membrane 41 can each be passed by with a bypass 39 and/or 40.

The composition of the resulting gas was then analyzed with the aid of a gas chromatograph 43, to which is attached a recording integrator 44 using "Porapak Q", "Porapak R" or molecular sieve 5A-columns. In addition to this, a tetrapole mass spectrometer 46 is attached directly to the cycle 52 by way of a gas input system 45. With the gas input system 45, a gas admixture at high pressure (e.g. atmospheric pressure), without changing the percentage composition, can be supplied to the mass spectrometer operated under high vacuum. In order to avoid condensation effects, the gas input system was heated (not shown in the drawing).

A computational device 48, attached by way of a coupling piece 47 to the tetrapole mass spectrometer 46, was employed in the processing and analysis of data. Due to the high sensitivity of mass spectrometry, it is only necessary to take very small numbers of samples for each analysis. Thus, over a period of some hours, samples can practically be taken continuously from the cycle without inducing a fall in pressure in the process. For the tests, a very high flow rate was chosen. Thereby, the conversion per flow-through proved small and the interpretation of the measurement results was able to be, according to the principle of a Batch reactor, easily undertaken. The testing mode also included several pressure regulators 34, manometers 35, an expansion container 49, a flow meter 50 and several pumps 51, as well as valves.

The following examples are given by way of illustration to further explain the principles of the invention. These examples are merely illustrative and are not to be understood as limiting the scope and underlying principles of the invention in any way. All percentages referred to herein are by weight unless otherwise indicated.

EXAMPLE 1

Catalytic Cracking of Methane into its Elements

In the testing procedure described above, a gas admixture of helium and 14.5 Mol % methane was pumped through in the cycle at 450° C. over a nickel catalyst on a ceramic support having the commercial designation BASF type G1-22. The cycle volume amounted to 6 liters, the catalyst volume 5 ml.

First Part of the Experiment

Figure 4:
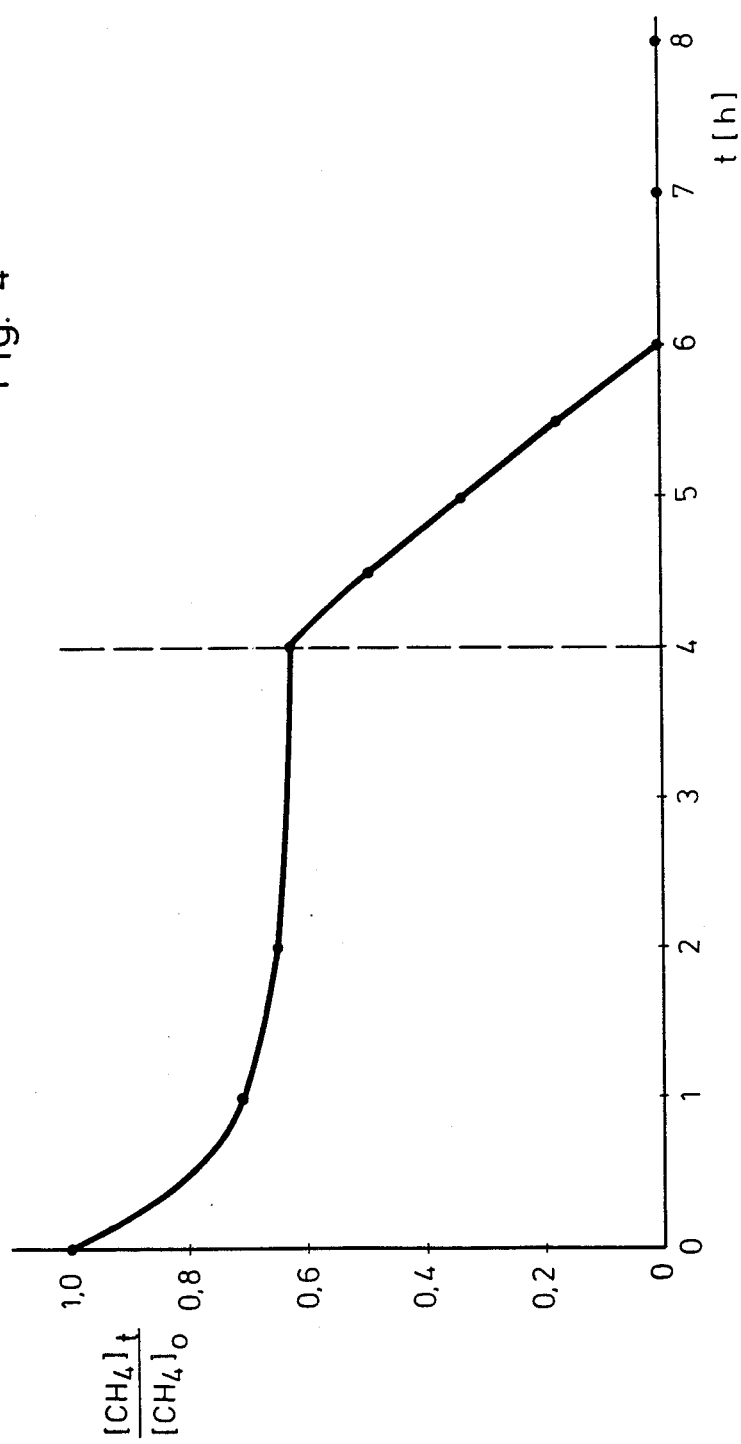
FIG. 4 is a graph illustrating the effectiveness of the cracking reaction of methane.

The temperature of the container with the palladium membrane was held at 25° C. The proof of the cracking of methane, in helium as carrier gas, was obtained by mass spectrometrical analysis of the methane and hydrogen content. The result is shown in FIG. 4 in the left-hand side of the curve (up to four hours). At the start of the experiment a cracking of the methane was indicated which nevertheless stagnated after about two hours. An XPS analysis (XPS=photoelectron spectroscopy) of the surface of the catalyst has shown that the carbon produced is in elemental form, and not in carbide form.

Second Part of the Experiment

However, if the palladium membrane is heated to 400° C., then hydrogen formed by the methane cracking reaction is continuously being extracted from the system. Conditioned on this situation, there takes a shifting of the chemical balance in the direction of product hydrogen, which has as a consequence that the conversion becomes quantitative (see FIG. 4, right-hand portion of the curve between four and six hours).

Third Part of the Experiment

The regeneration of the nickel catalyst was achieved by conveying light hydrogen in helium as carrier gas in a temperature range between 250° to 450° C. The elemental carbon deposited in the nickel catalyst was converted into methane by means of the addition of the hydrogen, and eliminated from the experimental procedure.

EXAMPLE 2

Catalytic Cracking of Ammonia into its Elements

Figure 5:
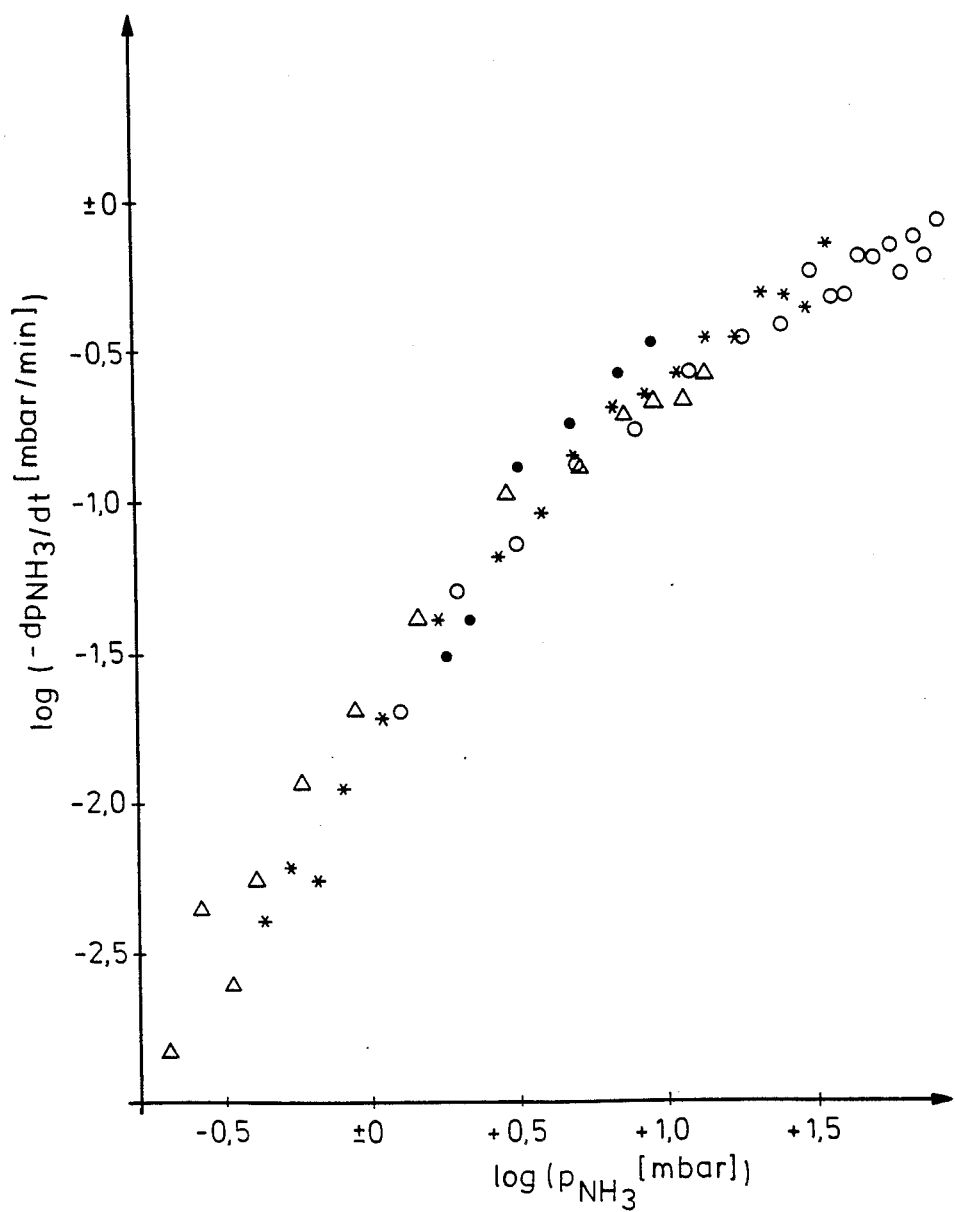
FIG. 5 is a graph illustrating the effectiveness of the cracking reaction of ammonia.

A gas admixture of helium and about 15 Mol % ammonia was run through the testing procedure at a flow rate of 18 l/h. The ammonia here was cracked in the container with the Pd/Ag membrane (surface 1.2 m$^2$) at 400° C. The mass spectrometrically-measured cracking speed, dependent upon four initial concentration of ammonia, is shown by FIG. 5. The partial pressure of ammonia for the initial concentration worked out at the following:
- ° 87.10 mbar
- * 35.48 mbar
- Δ 14.14 mbar
- • 9.33 mbar The reaction speed constants taken from the ammonia cracking worked out to $4 \times 10^{-13}$ molecules per cm$^2$ and second. The conversion is quantitative.

Comparative Example for a Helium-Methane Admixture

In by-passing the nickel catalyst, an admixture of helium and about 15 Mol % methane was pumped in the cycle over the palladium membrane at a flow speed of 18 l/h for a period of four hours. The temperature of the palladium membrane mounted to 400° C. In terms of mass spectrometry, no reduction in the methane content could be detected. This means that at the palladium membrane, ammonia exclusively is being cracked, but not methane. In contrast to this, however, on the nickel catalyst not only methane is cracked but ammonia as well.

It will be understood that the above description of the present invention is susceptible to various modifications, changes and adaptations, and the same are intended to be comprehended within the meaning and range of equivalents of the appended claims.

What is claimed is:

1. Process for decontaminating exhaust gas from a fusion reactor fuel cycle of exhaust gas components containing at least one heavy hydrogen isotope selected from tritium and deuterium in compound form, in which the at least one heavy hydrogen isotope is liberated from its compound, separated out from the exhaust gas and fed back into the fuel cycle, the compound form being at least one compound which is ammonia or a hydrocarbon, comprising:

(a) converting the at least one heavy hydrogen-containing compound into its elements in the exhaust gas by cracking the at least one heavy hydrogen containing compound with a cracking medium to liberate the hydrogen isotope,
   (b) passing the liberated hydrogen isotope through a membrane to separate out the liberated hydrogen isotope from the flow of the remaining exhaust gas, and
   (c) discharging the remaining decontaminated exhaust gas into the surrounding air.

2. Process according to claim 1, wherein the heavy hydrogen containing compound is ammonia, and a membrane made of palladium or palladium-silver alloy or an Ni-catalyst is used as a medium for cracking the ammonia.

3. Process according to claim 1, wherein the heavy hydrogen containing compound is a hydrocarbon, and an Ni-catalyst is used for cracking the hydrocarbon.

4. Process according to claim 1, wherein the heavy hydrogen containing compound is ammonia and hydrocarbon, and an Ni-catalyst or a membrane made of palladium or palladium-silver alloy is used as a medium for cracking the ammonia, and an Ni-catalyst is used for cracking the hydrocarbon.

5. Process according to claim 4, wherein the cracking reactions of the ammonia and hydrocarbon occur in successive steps.

6. Process according to claim 4, wherein the cracking reactions of the ammonia and hydrocarbon occur in a common process step.

7. Process according to claim 1, comprising, before cracking the heavy hydrogen containing compound: selectively oxidizing the exhaust gas at an oxidation catalyst to oxidize CO into $CO_2$, then bringing the exhaust gas into contact with an $O_2$ getter metal at a temperature of 200° to 400° C. to reduce water and remove $O_2$.

8. Process according to claim 1, wherein the exhaust gas contains ammonia and hydrocarbon and the membrane is made of palladium or a palladium-silver alloy which surrounds the catalyst, and further comprising carrying out the cracking reactions of ammonia and hydrocarbon at an Ni-catalyst on a ceramic catalyst support at a temperature of between 250° C. and 450° C., and heating the catalyst within the membrane simultaneously with the membrane to the reaction temperature.

9. Process according to claim 8, comprising, before cracking the heavy hydrogen containing compounds: selectively oxidizing the exhaust gas at an oxidation catalyst to oxidize CO into $CO_2$, then bringing the exhaust gas into contact with an $O_2$ getter metal at a temperature of 200° to 400° C. to reduce water and remove $O_2$.

10. Process according to claim 1, wherein the exhaust gas contains ammonia and hydrocarbon, and the cracking of the ammonia and hydrocarbon is performed by contacting the exhaust gas with a hydrogen-isotope-permeable membrane and with an Ni-catalyst at temperatures of from 300° to 450° C.

11. Process according to claim 10, comprising, before cracking the heavy hydrogen containing compounds: selectively oxidizing the exhaust gas at an oxidation catalyst to oxidize CO into $CO_2$, then bringing the exhaust gas into contact with an $O_2$ getter metal at a temperature of 200° to 400° C. to reduce water and remove $O_2$.

12. Process according to claim 1, wherein the exhaust gas contains ammonia and hydrocarbon, and wherein the cracking is performed by first contacting the exhaust gas with a hydrogen-isotope-permeable membrane at a temperature of 300° to 450° C. to crack the ammonia, and then contacting the exhaust gas with an Ni-catalyst at a temperature of 300° to 450° C.

13. Process according to claim 12, comprising, before cracking the heavy hydrogen containing compounds: selectively oxidizing the exhaust gas at an oxidation catalyst to oxidize CO into $CO_2$, then bringing the exhaust gas into contact with an $O_2$ getter metal at a temperature of 200° to 400° C. to reduce water and remove $O_2$.

14. Process for decontaminating exhaust gas from a fusion reactor fuel cycle of exhaust gas components containing at least one heavy hydrogen isotope selected from tritium and deuterium in compound form, in which the at least one heavy hydrogen isotope is liberated from its compound, separated out from the exhaust gas and fed back into the fuel cycle, the compound form being at least one compound which is water or ammonia or a hydrocarbon, comprising:
  (a) converting the at least one heavy hydrogen-containing compound into its elements in the exhaust gas by cracking the at least one heavy hydrogen containing compound with a cracking medium to liberate the hydrogen isotope,
  (b) passing the liberated hydrogen isotope through a membrane to separate out the liberated hydrogen isotope from the flow of the remaining exhaust gas, and
  (c) discharging the remaining decontaminated exhaust gas into the surrounding air.

15. Process according to claim 14, wherein the heavy hydrogen containing compound is water, and an $O_2$ getter metal is used to reduce the water.

* * * * *